United States Patent

[11] 3,567,119

| [72] | Inventors | Godfrey Wilbert |
| | | Seminary Hill Road, Carmel, N.Y. 10512; |
| | | Thomas Brown, 3767 S. Park Ave., |
| | | Balspell, N.Y. 14219 |
| [21] | Appl. No. | 864,184 |
| [22] | Filed | Oct. 6, 1969 |
| [45] | Patented | Mar. 2, 1971 |

[54] ENHANCED DIFFUSION OF ODOR VAPOR FROM POLYMERS
10 Claims, No Drawings

[52] U.S. Cl. .................................................. 239/6;
161/19, 161/21, 161/22, 161/25, 161/27, 161/28, 161/30;
206/4, 206/10, 239/34, 239/36, 239/60, 239/6,
252/522, 264/328, 264/329, 99/150, 99/151,
99/157, 99/166, 99/169, 99/171, 99/174, 2/4,
2/170, 2/171, 2/2, 21/55, 117/138.5, 424/25,
424/28, 424/29, 424/32, 424/76, 424/78, 424/83,
99/176

[51] Int. Cl. .................................................. A61k 21/12,
A61l 9/04, C11b 9/00

[50] Field of Search .................................................. 424/25, 76,
78, 83; 252/522; 239/6, 34, 36, 60; 161/19, 21, 22,
25, 27, 28, 30; 264/328, 329; 2/4, 170, 171.2,
(chem. abstracts), (perfume fragrance essences),
(in plastics)

[56] References Cited

UNITED STATES PATENTS

| 1,780,407 | 11/1930 | Smith ............................ | 239/36 |
| 2,422,145 | 6/1947 | Taylor .......................... | 252/522X |
| 2,566,410 | 9/1951 | Griffin .......................... | 252/522X |
| 2,865,806 | 12/1958 | Bulloff .......................... | 424/76 |
| 2,987,484 | 6/1961 | Lundberg et al .............. | 264/328X |
| 3,016,199 | 1/1962 | Keydel ......................... | 239/55 |
| 3,055,297 | 9/1962 | Leeds ........................... | 424/76X |
| 3,216,882 | 11/1965 | Feldt et al ..................... | 161/109 |
| 3,261,746 | 7/1966 | Copley .......................... | 252/522X |
| 3,310,235 | 3/1967 | Binden .......................... | 239/6 |
| 3,400,890 | 9/1968 | Gould ........................... | 239/36 |

FOREIGN PATENTS

| 184,534 | 8/1922 | Great Britain. |
| 298,823 | 10/1928 | Great Britain. |
| 848,122 | 9/1960 | Great Britain. |
| 1,176,992 | 4/1959 | France. |

OTHER REFERENCES

Kalish Drug and Cosmetic Industry 50(4):388-389Apr.1942 " Emulsified Perfumes and Toilet Waters"

Bassiri American Perfumer & Aromatics 71(2):38-41 Feb. 1958 " Some Remarks Concerning the Perfuming of Plastics- The problem of Fixation"

*Primary Examiner*—Shep K. Rose
*Attorney*—Frank S. Chow

ABSTRACT: This invention describes improved methods for the incorporating of fragrance compounds or oil bouquets and/or topical antifungal or antibacterial agents, insect repellent compounds and certain odoriferous medicaments into polymeric or natural materials so that the fabricated product possesses the properties imparted by the additive or additives for a long period of time. The efficiency of incorporating these additives in the materials mentioned above is improved by the use of surfactants and the effectiveness and duration of the additive or additives in the fabricated product is enhanced by employing antioxidants and/or ultraviolet radiation absorbers.

ENHANCED DIFFUSION OF ODOR VAPOR FROM POLYMERS

This invention concerns itself not only with improved methods for the incorporation of agreeable odoriferous additives into thermoplastic polymer, copolymer and polymeric coated natural materials (cellulose, wool, leather) but also describes methods for incorporating insect repellants, other than those mentioned in U.S. Pat. application Ser. No. 832,538 now abandoned, into the aforementioned polymers. This invention relates more particularly to new and improved methods for efficiently and intimately incorporating into the aforementioned materials the additives, to be presently detailed, and to their protection from oxidation, degradation and other chemical changes that can alter or diminish the utility of these additives during and after the polymeric molding, extrusion, film-forming or coating manufacturing process has been completed.

It is an object of this invention to provide practical and simple methods for incorporating into the aforementioned materials certain additives that will enhance the manufactured product, provide a durable utility for the product and increase consumer appeal.

Another object of this invention is to improve the efficiency, and thus the effectiveness and durability, of the additives by the use and addition of cationic or anionic surfactants or wetting agents to fragrance bouquet and insect repellants, as illustrations, prior to the latter bouquets or compounds being mixed with the solid polymer or copolymer particles, beads, solution or emulsion. These surfactants will be demonstrated to have two functions; improved adherence of a liquid additive to the polymeric material prior to manufacturing, and improved emulsification and dispersion in the polymeric material. The surfactants, described below, perform well in a nonaqueous system.

Still another object of this invention is to provide resistance to chemical changes for the additives being incorporated into the polymer, copolymer or polymeric coated natural materials by the addition, singly or in combination, of antioxidants and ultraviolet radiation absorbers to the fragrance materials, insect repellants, medicaments and antimicrobial agents prior to the manufacturing process.

Specifically, the antioxidant or antioxidants not only afford resistance to chemical changes for the additives during their initial exposure to heat during the polymeric molding, film forming, coating or extrusion manufacturing process, but they afford a certain definite degree of protection to chemical changes during the shelf life of the molded, extruded, film formed or coated polymeric, cellulosic or coated natural material manufactured product.

As described in a copending application Ser. No. 832,538, the incorporating of certain additives, such as fragrance oil bouquets and insect repellants, into polymeric materials, or the coating of natural materials impregnated with these additives, can be accomplished by several industrially practical methods. These additives either simulate, in the examples, using fragrance oil bouquets, natural odors associated with artificial flowers, fruits, shrubs, trees and vegetables or impart to other polymeric products pleasant odors. The incorporation of insect repellants into polymeric products, such as a coathanger, houseware appliance, camping equipment, apparel, etc., is also described.

Another object of this invention is the incorporation into polymeric and natural materials, the natural materials are cellulosic, wool and leather with a polymeric coating, of quaternaries not only useful as surfactants but also for utility as antimicrobial agents. In addition, to the use of quaternaries as antimicrobial agents other compounds with known antimicrobial activity may also be used.

In the aforementioned copending application Ser. No. 822,538, thermosetting polymer and copolymer were enumerated as the materials into which the additives were intimately incorporated. However, the preferred polymers are polyethylene and polypropylene or other copolymers containing polyolefins. The polyolefins, and specifically low- and medium-density polyethylene, are preferred because they permit more gas or vapor transmission (FIG. 4, Dow Polyethylene 1968, The Dow Chemical Co.) to a significantly greater extent than most other polymers as, for example, Saran (Trademark of The Dow Chemical Co.) polyvinylidene chloride resins. According to the same source of information, polystyrene also has comparatively significant gas or vapor transmission properties.

The gas or vapor transmission data is considered important to this invention because it complements the data described in the examples in a later section of this invention. The gas transmission data explains why molded, film formed and extruded, polyolefin, polyolefin copolymer and polystyrene objects will permit some gas or vapor transmission even of compounds or mixtures having a low vapor pressure at ambient temperature. According to two English workers (p. 101, C&EN, The Chemistry of Flavor, Apr. 3, 1967) a theory has been developed that even one molecule of a strong odorant, such as $\beta$-ionone, can cause an olfactory response on the human receptor cite and that weaker odorants require perhaps two or three molecules. This observation is consistent with the failure of even the most advanced gas chromatographic instrumentation to detect fragrance vapors arising from natural products or to detect the vapors of insect repellants arising from previously sprayed or treated skin surface areas from humans.

This invention demonstrates that in order to accomplish an improved uniform distribution and adherence of a fragrance oil bouquet, liquid insect repellent or the other additives cited, on the discrete particles of the polymer and copolymer prior to the molding, extrusion or film forming process, that the addition of surfactants, either cationic or anionic, in concentrations in the range of 0.5 percent to 20 percent based upon the weight of the additives, exhibit excellent wetting properties. Furthermore, these surfactants contribute to the emulsification of the additive in the polymeric material during fabrication.

Typical of these surfactants are quaternary ammonium compounds such as

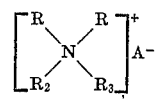

R, $R_1$, $R_3$ — are alkyl groups
$R_2$ — is polyalkoxyalkylene
A — is an anion and quaternary ammonium compounds such as

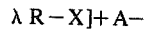

X — is a heterocylic moiety; pyridine, alkylpyridine, bipyridine, pyrimidine, quinoline or hydroxyquinoline, etc.
R — is acationcetyl group or N(lauroyl colomino formlymethyl), etc.
A — is an anion The incorporation of a small quantity of additive into polymer, copolymer or polymer coated natural materials such as a quaternary ammonium compound, not only functions as a surfactant but also imparts to the surface of the manufactured product aseptic properties or establishes conditions for reducing the number of microbial organisms, some of which can be pathogenic. It is readily apparent that numerous other antimicrobial agents, such as benzalkonium chloride and related types of compounds as hexachlorophene, may also be used. These latter compounds are by way of illustration and are not to be construed as limiting.

The molecular configuration of the surfactants that are employed in this invention depend to some degree upon the principle functional groups of the major components of an additive fragrance compound or oil bouquet or a specific additive compound that is being incorporated into the aforementioned materials, for example, a fragrance oil bouquet having as a major constituent a compound with a hydroxyl group or carbonyl group would require a cationic surfactant.

The function of the quaternaries or other antimicrobial agents for establishing conditions on the surface of the molded polymeric or natural or polymer coated natural product, that prevent or retard the growth of microorganisms assumes an additional significant role when the incorporation of these antimicrobial agents in the aforementioned materials is used for fabricating food or beverage containers, food wrappers or packaging materials or for other purposes. This role will be revealed in the appropriate examples. Foods, beverages or semifluid edibles packaged in containers or wrappers, incorporating an antimicrobial agent are found to be more platable and less objectionably odoriferous for longer periods of storage. For example, freshly purchased pasteurized milk, when stored in a container with small pieces of polymeric material incorporating an antimicrobial agent was definitely superior with respect to odor and taste, compared to a control sample. A significant difference in the milk samples, store in stoppered containers at 75° to 80° F. was markedly apparent after 6- and 12-hour periods. Without bacteriological testing it was readily decernible, since odor and taste in milk remaining at room temperature are related to bacterial action that the milk samples containing small quantities of the polymer with antimicrobial agents such as pyridinium quaternaries and compounds such as hexachlorophene were definitely superior to a control sample. A similar inhibition to spoilage was observed when samples of meat were subjected to analogous treatment. Concentrations of antimicrobial incorporated into polymeric material, polymer coated natural materials (cotton, wool, leather, paper) for the purposes described above may vary from 0.05 to 5 percent and the temperature for incorporating these antimicrobials in the polymeric or coated natural materials may vary between 75° to 250° C.

This invention also describes compounds that are useful in affording protection to the additives being incorporated into the aforementioned materials. The addition to additives being incorporated into polymer, copolymer or coated natural materials (cellulosics, wool, leather) of antioxidants is found to be effective and desirable for preventing thermal damage, oxidation and degradation during and following the processing of the manufactured product. The shelf life of the manufactured polymeric product containing the additive or additives, particularly fragrance oil bouquets, insect repellents and other additives to be described presently, is enhanced. Fragrance oil bouquets are found to retain their original odor for significantly extended periods of time. Typically, it has been determined that undesirable chemical changes can be minimized by the addition of antioxidants to the additives, already described, in concentrations from .05 percent to 20 percent of the weight of the additive, for example, fragrance oil, prior to the mixing or blending of the additive with the previously mentioned materials.

The antioxidants that are used in this invention are the primary hindered phenolic phosphite type to afford protection to the additive during the relatively short high temperature processing of the aforementioned materials; and the secondary type such as a thioester to extend protection to the chemical change of the additive during the shelf life of the product. Illustrative of typical antioxidants used to protect the additives from chemical changes are; dilaurylthiodipropionate; distearylthiodipropionate; 4,4'-butylidene bis(2-t-butyl-methylphenol); 2,6-di-t-butyl-4-methylphenol; 2,6-di-t-butyl-p-cresol (BHT); butylated hydroxyanisole (BHA) and 1,1-thiobis-(2-napthol).

The foregoing antioxidants are construed to be only illustrative but not limiting, since one experienced in the art could substitute numerous other thermally stable and equally effective antioxidants. For example, reported tests involving the use of the antioxidant 2,2'-methylene bis(4-ethyl-6-tertiary-butylphenol) show a definite protection against the oxidation of α-pinene when used in this compound alone.

Another novel feature of this invention is the additional protection to chemical changes that is given to the aforementioned additives, incorporated into the materials already described, by the addition to the additive, prior to processing, of ultraviolet radiation absorbers. The concentrations of these ultraviolet radiations absorbers that are used is .05 percent to 15 percent by weight of the additive being incorporated in the previously described materials. Ultraviolet radiation absorbers may be glyceryl p-aminobenzoate, methyl salicylate; and benzophenone derivatives, such as 2-hydroxy-4-n-octoxybenzophenone. Other thermally stable ultraviolet radiation absorbers, well known to the art, may also be substituted.

Copending application Ser. No. 832,538, described the incorporation of certain insect repellants into polymeric materials. This invention expands the number of the insect repellants to include dimethylphthalate, N,N-diethyl-m-toluamide and butylmesityloxide (butopyronoxyl). The insect repellants may also be incorporated into polymer, copolymer and coated natural materials with or without, depending upon the use of the product, the antioxidants, surfactants and ultraviolet radiation absorbers, already described. These insect repellants are incorporated into the aforementioned materials directly or by coating a polymeric product by immersion in a solution or suspension containing the insect repellent a solvent and a polymer or copolymer. A solution or mixture of a solvent, an insect repellent and polymer or copolymer may also be sprayed or coated on natural materials such as leather, wool, cotton fabric or other cellulosic material. These insect repellants are relatively nontoxic and may usually come in contact with the human epidermis without the deleterious effects of certain insecticides, such as 2,2-dichlorovinyl dimethyl phosphate, used in resin so-called no-pest strips U.S. Pat. Nos. 2,956,073; 3,116,201; and 3,318,769.

Polymeric or polymeric-coated natural materials containing insect repellants as an integral part are useful for tents for camping or the military, for wearing apparel such as outer garments, for hatbands manufactured from a polyolefin, for wrist bands, necklaces and for polymeric coated or uncoated ornamental selfadhering patches for clothing.

It is recognized that some producers of bulk polymer or copolymer or polymeric fibers or manufacturers of finished polymeric products do incorporate ultraviolet radiation absorbers and antioxidants into these materials. However, this invention is not concerned with the protection of the polymeric material or the products themselves to chemical changes, but specifically with affording resistance to chemical changes to the aforementioned additives. The significance of the direct use of antioxidants, ultraviolet radiation absorbers and surfactants with the additives that are incorporated into the materials, already described, will become evident from the data in the examples.

Another embodiment of the invention is the incorporation of certain accepted odoriferous medicaments such as camphor, 1 or d1-menthol and methyl salicylate, into polymer, copolymer or polymeric coated natural materials (cellulosic, wool, leather). The concentrations of these medicants may vary between 0.5 percent to 10 percent. Products incorporating these medicants can be worn by an individual around the neck upon retiring or during periods of activity. Further, these medicaments may also be protected from the effects of oxidation and ultraviolet radiation degradation by the use of the appropriate antioxidants or ultraviolet radiation absorbers. Similarly, surfactants may be used to more efficiently incorporate the medicaments in the materials already described.

In addition to those polymeric and polymeric-coated natural products mentioned in copending application Ser. No. 832,538, a partial list of other products to which the methods of this invention are applicable are cited: luggage, food storage boxes, disposable garbage bags, novelty items such as cosmetic cases, ladies handbags, necklaces, buckles and belts, wristlets, ornamental pieces with pins or with adhesive backing, throw away clothing, hospital equipment, dinner and houseware articles, appliance parts, cosmetic and food containers or packaging, automobile seat covers, combs, brushes, aviation parts, toys, coated or uncoated piping and plumbing materials, marine hulls, and parts, camping equipment, wearing apparel, outdoor furniture and indoor-outdoor carpeting.

According to the invention, novel methods are described and means are provided for improving the efficiency of incorporating the additives, already described, into polymer, copolymer and polymeric-coated natural materials (cellulosic, wool, leather) and giving new utility or enhancing the utility of products manufactured from these materials. This invention describes this art by the addition, to the aforementioned additives, of antioxidants, surfactants and ultraviolet radiation absorbers just prior to the mixing with the polymer, copolymer, solution or polymer suspension and before the fabrication process.

Additive incorporation in a fabricated product can also be accomplished by impregnating cellulosics, wool or leather with a solvent solution of the same additive and then lightly coating, after the solvent has evaporated, by spraying with a solution of a polyolefin or a polystyrene or other appropriate solution polymer.

Depending upon the additive or additives being intimately incorporated into the polymer or copolymer, several criteria are used to determine the effectiveness of the surfactants. The influence of the surfactant is readily and easily observed visually. This is apparent when a surfactant is added to a fragrance oil or a liquid insect repellent. When the liquid or oil containing the surfactant is mixed with the particles or beads of polymer or copolymer and the entire mass is charged into the hopper of the molding machine, little or no separation of the oil or liquid is observed in the bottom of the hopper after processing. Control runs without the surfactant, show more rapid draining of the additive from the polymer or copolymer. In addition, olfactory testing of the molded objects demonstrate that the additive is present in the molded object in greater concentration, compared to a control fabricated without the surfactant. This is not only due to the fact that the surfactant acts to permit improved adherence of the additive to the polymer or copolymer surfactant just prior to processing but also to the well-known fact that surfactants act as emulsifiers. This latter observation also applies to powdered or crystalline additives such as antimicrobial agents and insect repellants.

Since ultraviolet radiation absorbers are universally used in fabricating polymers and copolymers and their effectiveness in minimizing or preventing degradation of organic compounds has been thoroughly explored and demonstrated, it is a corollary that the use of the ultraviolet absorber, previously mentioned, will afford similar protection to the additives already described in this invention. Nevertheless, it can be demonstrated that when fabricated objects containing fragrance and ultraviolet radiation absorbers are exposed to direct sunlight the ultraviolet absorber does prolong the emission of the desired odoriferous vapor from the polymer, copolymer or coated natural product. Control runs without the ultraviolet radiation absorber showed diminished emission of odoriferous vapors.

While the methods and concepts of incorporating the previously mentioned additives into polymers, copolymers or polymeric coated natural materials are new and novel, the fabrication of the polymer and copolymer containing the additives embraces the general categories for fabrication, such as melt methods and solution methods (Preparative Methods of Polymer Chemistry, Sorenson and Campbell, Interscience Publisher, 2 ed., pp. 23 to 41).

Still another embodiment of this invention is the incorporation of an additive or additives, already described, into polymer and copolymer emulsions. These emulsions are then employed for the coating of natural and synthetic fibers or fabrics, so that the resulting coated finished products will possess one or more of the desirable properties, similar to that described for molded or extruded polymeric products. This is accomplished by adding to the polymer or copolymer emulsion, during their preparation, an additive or additives such as a fragrance, insect repellent or antimicrobial agent in concentrations of 0.1 percent to 20 percent of the weight of the emulsion solids. The additive or additives are incorporated into the emulsion during the appropriate phase of their preparation as described in specific examples. A similar end-result is also accomplished by impregnating a cellulosic, wool, leather or synthetic fiber or fabric with a solvent solution of the additive. The solvent is then permitted to evaporate and the materials just mentioned are lightly coated with a normal polymer or copolymer emulsion containing no additive. Additive vapors such as those produced by fragrance bouquets can then be slowly transmitted through the coating, particularly polyethylene.

Another object of this invention is the use of polymer and copolymer emulsions with the appropriate changes in their formulation for surface coating. Such surfaces may be wood or polymeric-fabricated floors, shelves and certain interior automobile or aircraft surfaces. The application of such emulsions containing more than one of the additives already described can then impart to the surfaces on which they are applied a pleasant fragrance, antimicrobial properties and/or insect repelling properties of long duration. The novelty of this application permits attaining eventually a polymeric surface coating with the above-mentioned properties that will not be readily dissipated.

The examples described below are given by way of illustration and not by way of limitation. The scope of this invention is determined by the appended claims.

EXAMPLE 1

To 6.7 grams rose perfume oil[1] was added 0.3 grams of an anionic surfactant[2]. These two components were mixed and then thoroughly blended with 215.7 grams of intermediate density polyethylene beads and 11.35 grams of a red color concentrate[3]. The entire mixture was then charged, in two portions, to the hopper of a Van Dorn Plastic Molder. With the average cylinder temperature of the molder, both front and rear, at about 300° F. and a molding pressure of 450 to 500 p.s.i., the material was processed in 16 minutes to give 24 retained molded pieces of irregular shape and thickness weighing about 8 grams each, run A. The initial molded pieces that were processed were discarded to insure that the machine's cylinder, piston and mold were adequately purged. After processing it was readily apparent that no significant quantity of perfume oil had drained off the polyethylene beads since the oil was not observed at the bottom of the hopper adjacent to the retracted piston. A similar control, run B, without the addition of the surfactant showed distinct evidence of a portion of the perfume oil at the bottom of the hopper after processing. The same number of pieces weighing 5.0 grams were cut from similar parts of the molded objects from runs A and B, respectively, and placed in two 250-ml. beakers marked A and B. These two beakers containing the pieces were retained for olfactory testing.

Panel olfactory testing by six individuals demonstrated that initially the odor from run A was significantly stronger than run B. After 8 weeks olfactory testing showed that the rose perfume oil odor was distinctly detectable from both run A and run B. However, run A had the more readily detectable and more pronounced odor.

---

[1] Givauden Corp., 321 W. 44th Street, New York, N.Y. 10036.
[2] Witco Chemical Corp., Emcol 4,600 (oil soluble), New York, N.Y. 10017.
[3] Color Chip Corp., Roselle, N.J.

EXAMPLE 2

This run was made under similar conditions to that described in example 1. The differences were that 6.7 grams of lavender bouquet oil[1] was substituted for the rose oil perfume and that 0.30 grams Emcol CC-9, a quaternary ammonium chloride derivative of polyalkoxy tertiary amine[2], a cationic wetting agent, was substituted for Emcol 4,600 used in example 1. A 250-ml. beaker containing 5.0 grams of pieces cut from similar parts of the molded objects, run A was retained for olfactory testing. A similar run B was made substituting Emcol E-607[3] for Emcol CC-9[2]. It was observed in both runs A and B that no odor of an amine or pyridine moiety was detectable[4] after the molding process. Run C was made in a similar manner except no quaternary was used. Samples of the molded product from each run were retained for olfactory testing. It was observed that run C had more draining during processing of the lavender bouquets than either run A and run B. Runs A and B had significantly stronger odors from the incorporated bouquet oil than control run C. After 8 weeks olfactory panel testing revealed that the odoer from the lavender bouquet oil was distinctly and easily detectable in samples from runs A, B and C. However, run A and run B had more pronounced odors.

[1] Givauden Corp., GD 4,100.
[2] Witco Chemical Corp., cationic quaternary ammonium chloride derivative of polyalkoxy tertiary amine.
[3] Witco Chemical Corp., N(lauroyl colomino formylmethyl) pyridinium chloride.
[4] In the cases of both runs A and B, degradation of either quaternary would have produced characteristic readily detectable amine-like odors. Emcol E-607 has excellent and effective high dilution germicidal and fungicidal properties (Witco Chemical Corp., Bulletin 51, reprinted Mar. 1967).

EXAMPLE 3

This run was made under similar conditions to that described in example 1 using the same quantities of rose oil perfume and Emcol 4,600 surfactant. However, 0.30 grams of an antioxidant Plastanox 1,161[1] was added and mixed with the rose oil perfume prior to the processing of the entire mixture through the molding machine. The molded pieces were labeled A. A second run B was made with all the components just described and with the addition of 0.30 grams Plastanox LTDP[2] antioxidant to the rose perfume oil containing Emcol 4,600 and Plastanox 1,161[1]. Run B was processed in the same manner as run A. Another run C was made similar to run A but without either of the antioxidants used in runs A and B. Samples from each run weighing 5.0 grams, cut from the similar parts of the molded pieces, were retained for olfactory testing in three separate 250-ml. beakers. Panel olfactory testing by six individuals showed that after 8 weeks the fragrance odor from each run was readily detectable. However, runs A and B had stronger odors even just after processing. Run B was given the highest rating by five of the six panel members after 8 weeks. Rubbing the finger over the molded pieces resulted in no detectable odor of the fragrance on the fingers. This same result was also obtained with samples from examples 1 and 2.

[1] American Cyanamid Co., Bound Brook, N.J. 08805, Plastanox 1,161, primary type antioxidant based upon the hindered phenolic structure (phenolic phosphite) added to afford protection during the relatively high-temperature molding process.
[2] American Cyanamid Co., Bound Brook, N.J. 08805, Plastanox LTDP Antioxidant, dilaurylthrodipropionate, secondary antioxidant. (Note: added to improve the fragrance shelflife in the molded product).

EXAMPLE 4

To 100.0 grams of low density polypropylene was added a mixture containing 4.0 grams 2-ethyl-1,3-hexanediol, 0.30 grams Emcol CC-9 (cationic wetting agent) and 0.30 grams Plastanox 1,161[2] antioxidant. The polypropylene beads and the mixture were thoroughly mixed. Then small portions were rapidly heated with stirring to 160° to 165° C. and threads were removed with a glass rod, run A. A control run B was made with polypropylene alone. Equal quantities of threads from each run were wrapped around jute strings for use as necklaces and anklets on human subjects. These necklaces and anklets prepared from each run were retained for filed testing. Run C was made similar to run A except that 4.0 grams 2-ethyl-1,3-hexanedial was used without the addition of the surfactant (wetting agent) or the antioxidant. Tests made with nine human subjects alternately wearing control necklaces and anklets and similar necklaces and anklets from runs A and C on the exposed parts of the neck and ankles, in eastern and western New York State mosquito-infested areas for 2-hour periods after sunset in June and July, demonstrated that significant protection from mosquito attraction and bites was afforded to seven of the nine subjects wearing the necklaces and anklets prepared from runs A and C. Five individuals reported necklaces and anklets from run C were less effective than from run A.

EXAMPLE 5

A run A was made similar to example 1 with the same quantity of rose perfume oil and the anionic wetting agent. In addition, 0.50 grams of Cyasorb UV 531, 2-hydroxy-4-n-octoxy-benzophenone[1], an ultraviolet radiation absorber, was also added and processed as described in example 1. Run B, similar to run A, but without the ultraviolet radiation absorber was made as a control. Samples prepared as described in example 1 were retained for exposure to sunlight and olfactory testing. These samples were exposed to weathering and received a minimum of 60 hours of exposure to direct midday sunlight during May and June in eastern New York State. Olfactory testing by a panel of six individuals showed that the ultraviolet radiation absorber protected the rose perfume oil as evidenced by a more pronounced odor from samples of run A compared to run B. The odor from run A was also more comparable to the original fragrance.

[1] American Cyanamid Co., Bound Brook, N.J. 08805,

EXAMPLE 6

To 5.5 grams of apple blossom oil bouquet[1] was added 0.50 grams N(lauroyl colomino formylmethyl) pyridium chloride Emcol E607[2] and the two components were agitated rapidly and then thoroughly blended with 221 grams of low-density polyethylene beads. The entire mixture was then charged in two portions to a Van Dorn Plastic Molder using the same temperature and pressure as described in example 1. Small strips weighing 5.0 grams were placed in a 250-ml. beaker and retained for olfactory testing. Panel testing by six individuals after 8 weeks showed no significant decrease in the fragrance odor[3].

[1] Givaudan Corp., 321 W. 44th Street, New York, N.Y. 10036; Fleurs Bouquet W-1632.
[2] Witco Chemical Corp., 277 Park Avenue, New York, N.Y. 10017; Emcol E-607, Quaternary Ammonium Compound with germicidal and fungicidal properties (Org. Div., Bulletin 51, Mar. 1967)
[3] Note: During the molding process and during the testing no amine or pyridine moiety odor was detected.

EXAMPLE 7

To 100 ml. of a 20 percent by weight in volume solution of low-density polyethylene in toluene at 80°—85° C. was added 2.0 grams N,N-diethyl-toluamide. This solution was then manually coated on both sides of a 1-square foot cotton cloth, the solvent permitted to evaporate off and the cloth was then pressed between two metal plates at 80° C. for about 2 minutes. The same procedure was used to field test the treated fabric, as described in example 4. As a control an untreated piece of the same cotton fabric was used. The results of field testing against mosquitoes were almost similar to those in example 4 except that 6 of the nine individuals tested reported definite mosquito protection.

EXAMPLE 8

To 99.0 grams of low-density polyethylene was added 1.0 gram of powdered U.S.P. menthol. The two components were thoroughly mixed and the material was processed through a Van Dorn Plastic Molder at a front and rear cylinder temperature of 300° F. and 400 to 500 p.s.i.g. The molded objects, weighing approximately 8 grams each, were retained for olfactory testing. After 2 months a panel of six individuals reported readily detectable vapor of menthol from the molded pieces.

A similar run was made using methyl-salicylate 1.0 gram to 99.0 grams of low-density polyethylene. The results of olfactory testing were also similar.

EXAMPLE 9

An emulsion of low-density polyethylene was prepared. To 25.0 grams of the polyethylene was added 6.5 grams of stearic acid and the two components were melted and mixed at about 120° C. To the melt was also added 6.5 grams triethanolamine with agitation. The latter three components were then slowly added with rapid agitation to 175 ml. water at 90° to 95° C. The heated mixture containing the polyethylene was introduced into the vortex formed by the agitator in the water. While maintaining the emulsion at 40° to 45° C., to two separate portions were added the following, with stirring:
  A. 100.0 grams emulsion containing 2.5 grams rose perfume oil and 0.10 gram Plastanox LTDP [1]
  B. 100.0 grams emulsion containing 4.0 grams 2-ethyl-1,3-hexanediol and 0.10 gram Plastanox LTDP [1].

cotton fabric, 3 inches by 5 inches, was immersed in emulsion A and similarly another piece of cotton fabric (same dimensions) was immersed in B. After about 5 minutes immersion the cotton strips were removed from their respective emulsions, excess emulsion was permitted to drain off and then pressed between two metal plates at about 100° C. for about 1 minute. The cotton strips were then dried at 50° C. for 30 minutes.

[1] See example 2, note[2].

Other fabric strips of the same dimensions as A and B were treated in 50 ml. of the following emulsions, similarly to A and B:
  C. A-C Polyethylene[1] containing 0.50 grams benzalkonium chloride mixture used to treat Dacron/Wool blend (about 4 oz./sq. yd.)
  D. A-C Polyethylene[1] containing 0.50 grams cetylpyridinium chloride mixture used to treat Orlon cloth (about 3.5 oz./sq. yd.)
  E. A-C Polyethylene[2] containing 1.00 grams lavender bouquet[3] mixture used to treat cotton cloth (about 3 oz./sq. yd.)

Fabric patches C, D and E were treated similarly to A and B. Fabric patch E, after normal water detergent laundering three times, still retained a readily detectable odor of the fragrance bouquet.

Material from B was cut into smaller strips; and anklets and wristlets were prepared as described in example 4. Field testing with nine individuals wearing the strips during the months of June and July were reported effective for repelling mosquitoes as compared to similar strips containing no insect repellant. On individual 3-inch by 5-inch treated strips, from runs C and D was placed 5 ml. of freshly purchased pasteurized milk. These strips with the milk were permitted to stand at 75°–80° F. with a similarly prepared control strip containing no antimicrobial agent. After 12 hours, olfactory testing showed that the control strip had a distinctly sour–almost putrid odor–while strips C and D had only a slightly off "sweet"–milk-like odor.

[1] Allied Chemical Corp., Morristown, N.J., A-C Polyethylene 392, Nonionic Type Emulsion 25 percent solids, contains Aqualene H.
[2] Allied Chemical Corp., Morristown, N.J., A-C Polyethylene 629, Nonionic Type Emulsion (includes Igepal CO-710, 1/2 KOH-ethylene glycol).
[3] Givaudan Corp., 321 W. 44th Street, New York, N.Y. 10036, lavender bouquet GD 4,100.

EXAMPLE 10

To 50.0 grams low-density polyethylene maintained at about 100°–110° C. was added 0.50 grams cetyl pyridinium chloride. The quaternary was rapidly blended with the polyethylene and then a portion of the molten mix was placed between two stainless steel plates (plate temperature 100° C.) and sufficient clamp pressure was applied to the plates to form the desired film. The plates were spread apart, rapidly cooled and a 2-mm. film of the polyethylene containing the quaternary was removed, run A.

To 50.0 grams low-density polypropylene maintained at 165° C. was rapidly added and blended 2.0 grams 2-ethyl-1,3-hexanediol. A portion of the melt-mix was treated as described for run A. This sample was labeled run B.

EXAMPLE 11

To individual 10-gram portions of polyethylene powder was added the quantities of antimicriobial agents cited below. To each of these 10-gram portions was added 90 grams of low-density polyethylene and then each sample was thoroughly blended and then injection molded into solid pieces through a cleaned and purged molding machine at 280

TABLE 1

| | Antimicrobial agent | Concentration, percent [2] |
|---|---|---|
| Run No.: | | |
| 1A | Cetylpyridinium chloride | 0.25 |
| 1B | do | 0.50 |
| 1C | do | 1.00 |
| 2A | Emcol E-607 [1] | [3] 0.25 |
| 2B | do.[1] | 0.50 |
| 2C | do.[1] | 1.00 |
| 3A | Hexachlorophene | 0.25 |
| 3B | do | 0.50 |
| 3C | do | 1.00 |
| 4A | Control | .00 |

[1] See Example 6, Note (2).
[2] Concentration in the final blend.
[3] 2 × ½ × ⅛.

Strips of the molded polymer measuring 2 inches by ½inch by ⅛ inch were immersed in 30-ml. portions of freshly purchased pasteururized milk, in stoppered containers and permitted to stand, with stirring every four hours, at 75° to 80° F. A panel of six individuals tasted and performed olfactory testing at 4-hour intervals. The results of their testing are tabulated in table 2.

TABLE 2

| Run No. | 4 hours | | 8 hours | | 12 hours | | 16 hours | |
|---|---|---|---|---|---|---|---|---|
| | Odor | Taste | Odor | Taste | Odor | Taste | Odor | Taste |
| 1A | S | S | S– | S– | S– | S– | U | U |
| 1B | S | S | S | S | S | S | S– | S– |
| 1C | S | S | S | S | S | S | S– | S– |
| 2A | S | S | S– | S– | S– | S– | S– | S– |
| 2B | S | S | S | S | S | S | S– | S– |
| 2C | S | S | S | S | S | S | S– | S– |
| 3A | S | S | S– | S– | S– | S– | S– | S– |
| 3B | S | S | S | S | S | S | S– | S– |
| 3C | S | S | S | S | S | S | S– | S– |
| 4A | S | S | S– | S– | U | U | U | U |

Note: Odor and Taste
  S   Satisfactory
  U   Unsatisfactory
  S–  Starting to turn sour Low-density polyethylene was film formed after mixing the polyethylene pellets with 0.50 percent by weight of Emcol E-607. The plates were maintained at 110°–120° C. and pressure applied to form the film with manual clamps. Melting the polyethylene and quaternary and film forming was accomplished in 3 to 5 minutes. This run was 5A and a control run containing no quaternary was called 5B. Strips of the polyethylene films were cut into squares 3 inches by 3 inches and used to wrap equal weights of freshly purchased vacuum-packaged bologna. The results of olfactory at 75° to 80° F. testing by a panel of six individuals are recorded in table 3.

TABLE 3

| Run No.: | Antimicrobial agent | Olfactory rating, hours | | | |
|---|---|---|---|---|---|
| | | 4 | 12 | 24 | 36 |
| 5A | Emcol E-607 | S | S | S | S- |
| 5B | Control | S | S- | S- | U |

S    Satisfactory
S-    Satisfactory, starting to become slightly objectionable
U    Objectionable

We claim:

1. In a method for the emission or diffusion of odoriferous vapors or incorporated odorant additive compounds, particularly those having a hydroxyl group or carbonyl group as a major constituent, selected from the group consisting of fragrance compounds, oil bouquets, insect repellants and pleasantly odoriferous medicaments, said odorant compounds being subjected to conditions of thermal damage, oxidation and degradation during and following processing into articles having imparted aseptic properties manufactured from polyolefins, polyolefin copolymers or polystyrene polymers, having comparatively significant odorant vapor transmission properties which polymers are molded or extruded at high temperatures causing chemical changes in the additives, the improvement which comprises diffusing odorant vapors capable of causing a distinctly detectable olfactory response during a prolonged odoriferous vapor emission process from injected or moulded polyolefin, polyolefin copolymer, or polystyrene articles prepared by the improvement which consists of the steps of adding from about 0.5 to about 20 percent of a quaternary ammonium surfactant impregnant, an ultraviolet radiation absorber, and a thermally stable antioxidant, said percentage being based on the weight of the odorant additive, said steps of addition of the additives being effective while the polymer is softened or melted at a temperature from about 80° C. to 300° C. and prior to melting or extrusion pressures of from about 300 to about 10,000 p.s.i.

2. A method according to claim 1 wherein the incorporated odorant additive is an insect repellent.

3. A method according to claim 2 wherein the insect repellent is incorporated into a necklace, wristlet or anklet garment article manufactured from said molded or extruded polymers, said articles when worn on exposed body parts of human subjects in a mosquito-infested area afforded significant protection from mosquito attraction and bites.

4. A method according to claim 2 wherein the insect repellent is selected from the group consisting of 2-ethyl-1,3-hexandiol, dimethyl-phthalate, N, N-diethyl-m-toluamide, and butyl mesityl oxide.

5. A method according to claim 1 wherein the incorporated odorant additive is a pleasantly odiferous medicament.

6. A method according to claim 4 wherein the pleasantly odiferous medicament is selected from the group consisting of menthol, camphor and methyl salicylate.

7. A method according to claim 1 wherein a nonodorous antimicrobial agent other than the quaternary ammonium surfactant is also incorporated into the articles.

8. A method according to claim 6 wherein the antimicrobial agent is hexachlorophene.

9. A method according to claim 1 wherein the incorporated odorant additive is a fragrance compound or oil bouquet.

10. A method according to claim 1 wherein the article is manufactured by injection molding.